United States Patent
Zbiral et al.

(10) Patent No.: US 11,703,160 B2
(45) Date of Patent: Jul. 18, 2023

(54) PIPE COMPONENT

(71) Applicant: MANN+HUMMEL GmbH, Ludwigsburg (DE)

(72) Inventors: Robert Zbiral, Marbach (DE); Steffen Grau, Oppenweiler (DE); Juergen Schlamp, Remseck (DE); Thorsten Schmid, Schwaikheim (DE); Matthias Teschner, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/102,686

(22) Filed: Nov. 24, 2020

(65) Prior Publication Data
US 2021/0148490 A1 May 20, 2021

Related U.S. Application Data

(63) Continuation of application No. PCT/EP2019/057983, filed on Mar. 29, 2019.

(30) Foreign Application Priority Data

May 24, 2018 (DE) ...................... 10 2018 112 488.0

(51) Int. Cl.
*F16L 11/112* (2006.01)

(52) U.S. Cl.
CPC .................................. *F16L 11/112* (2013.01)

(58) Field of Classification Search
CPC ....................................................... F16L 11/112
USPC .......................... 138/119, 121, 138, 173, 174
See application file for complete search history.

(56) References Cited

U.S. PATENT DOCUMENTS

| | | | | |
|---|---|---|---|---|
| 1,606,810 A | * | 11/1926 | Saylor | H02G 3/02 174/124 R |
| 2,848,015 A | * | 8/1958 | Roberts | B29C 49/20 D23/266 |
| 2,898,940 A | * | 8/1959 | Cole, Jr. | F16L 11/15 138/121 |
| 3,028,290 A | * | 4/1962 | Roberts | B29D 23/18 156/581 |
| 3,076,737 A | * | 2/1963 | Roberts | B29D 23/18 138/121 |
| 3,275,038 A | * | 9/1966 | Roberts | F16L 11/112 138/122 |

(Continued)

FOREIGN PATENT DOCUMENTS

| DE | 1238341 B | 4/1967 |
|---|---|---|
| EP | 1983243 A1 | 10/2008 |
| FR | 2870916 A1 | 2/2005 |

*Primary Examiner* — Kenneth Rinehart
*Assistant Examiner* — Richard K. Durden

(57) ABSTRACT

A pipe component has a casing embodied as a folded bellows with folds. A tubular support body has an outer circumference and a length extension in a direction of a center line of the tubular support body. The tubular support body is embedded in the casing and supports the casing. The tubular support body has at least one stabilization element and the at least one stabilization element has segments that are axially spaced apart and at least partially extend circumferentially. The segments are connected by one or a plurality of hinges, respectively, along the length extension of the tubular support body. The hinges are arranged in the folds of the folded bellows of the casing.

12 Claims, 15 Drawing Sheets

(56) References Cited

U.S. PATENT DOCUMENTS

| | | | |
|---|---|---|---|
| 3,349,806 A | | 10/1967 | Roberts |
| 3,578,028 A | * | 5/1971 | Roberts ................ F16L 11/085 |
| | | | 138/123 |
| 3,842,865 A | | 10/1974 | Torricelli |
| 4,140,154 A | * | 2/1979 | Kanao .................... F16L 11/112 |
| | | | 138/132 |
| 4,212,329 A | * | 7/1980 | Horton ...................... F16L 9/22 |
| | | | 138/158 |
| 4,383,554 A | * | 5/1983 | Merriman ............... F16L 11/18 |
| | | | 138/155 |
| 4,456,034 A | * | 6/1984 | Bixby .................... F16L 11/118 |
| | | | 138/131 |
| 4,796,672 A | * | 1/1989 | Kanao .................... F16L 11/24 |
| | | | 138/129 |
| 5,193,588 A | * | 3/1993 | Kanao .................... F16L 11/16 |
| | | | 138/121 |
| 5,203,380 A | * | 4/1993 | Chikama .............. A61B 1/0057 |
| | | | 138/121 |
| 5,843,542 A | * | 12/1998 | Brushafer ................ D03D 9/00 |
| | | | 428/36.1 |
| 2010/0050369 A1 | | 3/2010 | Rosenzweig |
| 2010/0108170 A1 | | 5/2010 | Chudkosky et al. |
| 2014/0027001 A1 | * | 1/2014 | Matzen ................... B29C 49/20 |
| | | | 264/501 |
| 2017/0050369 A1 | | 2/2017 | Kerber |
| 2019/0360617 A1 | * | 11/2019 | Forstner ................ F16L 51/025 |

* cited by examiner

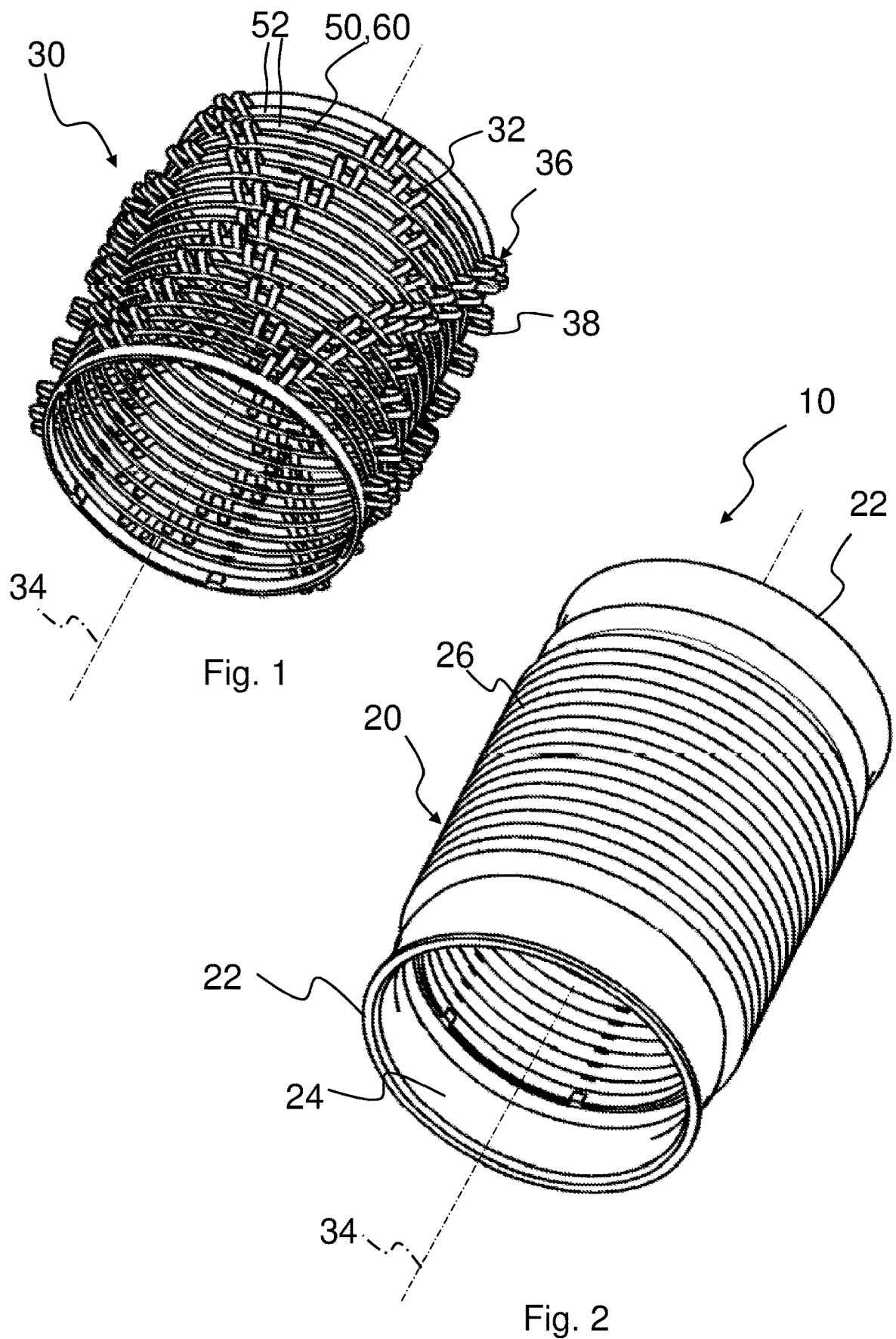

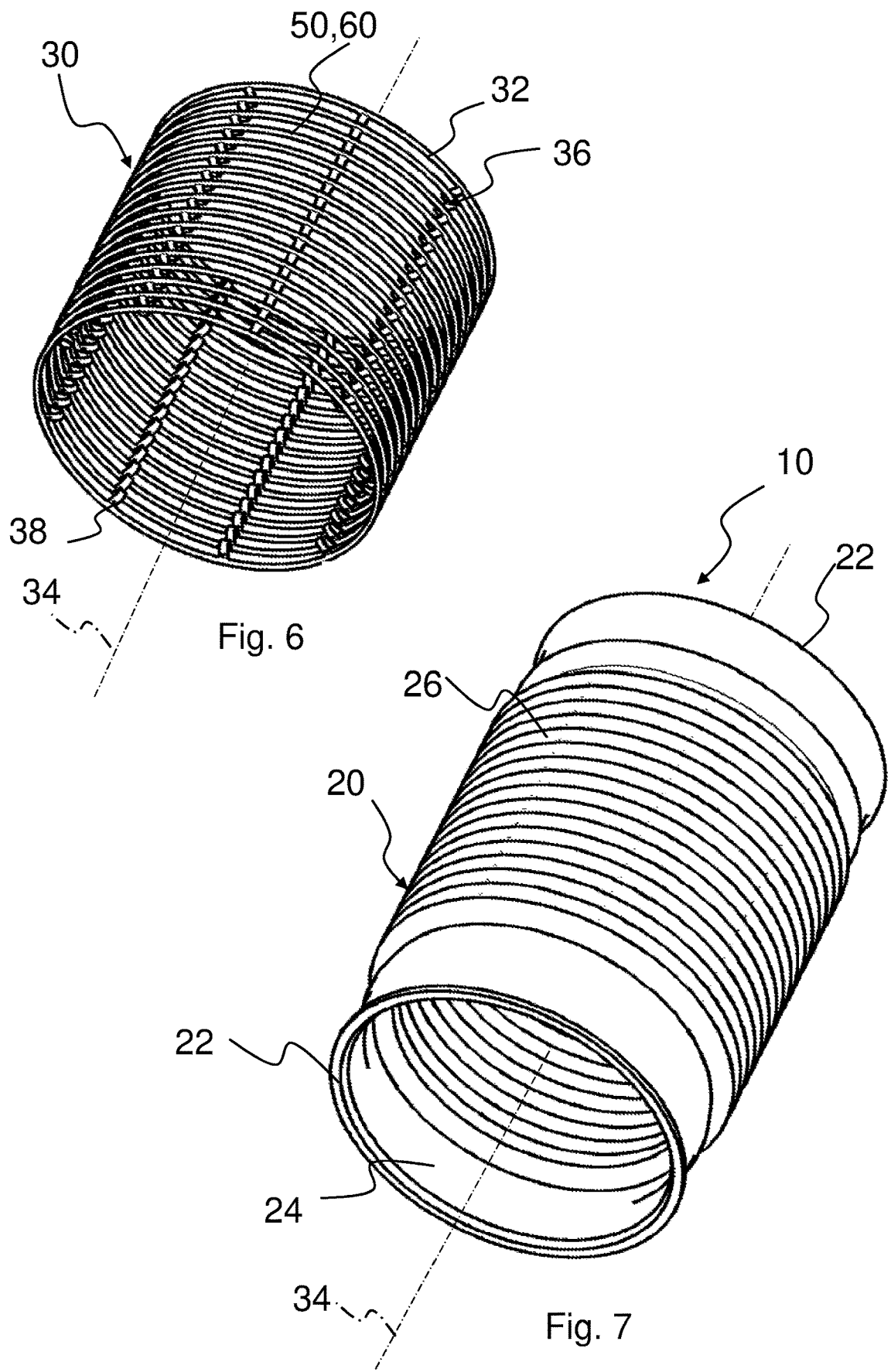

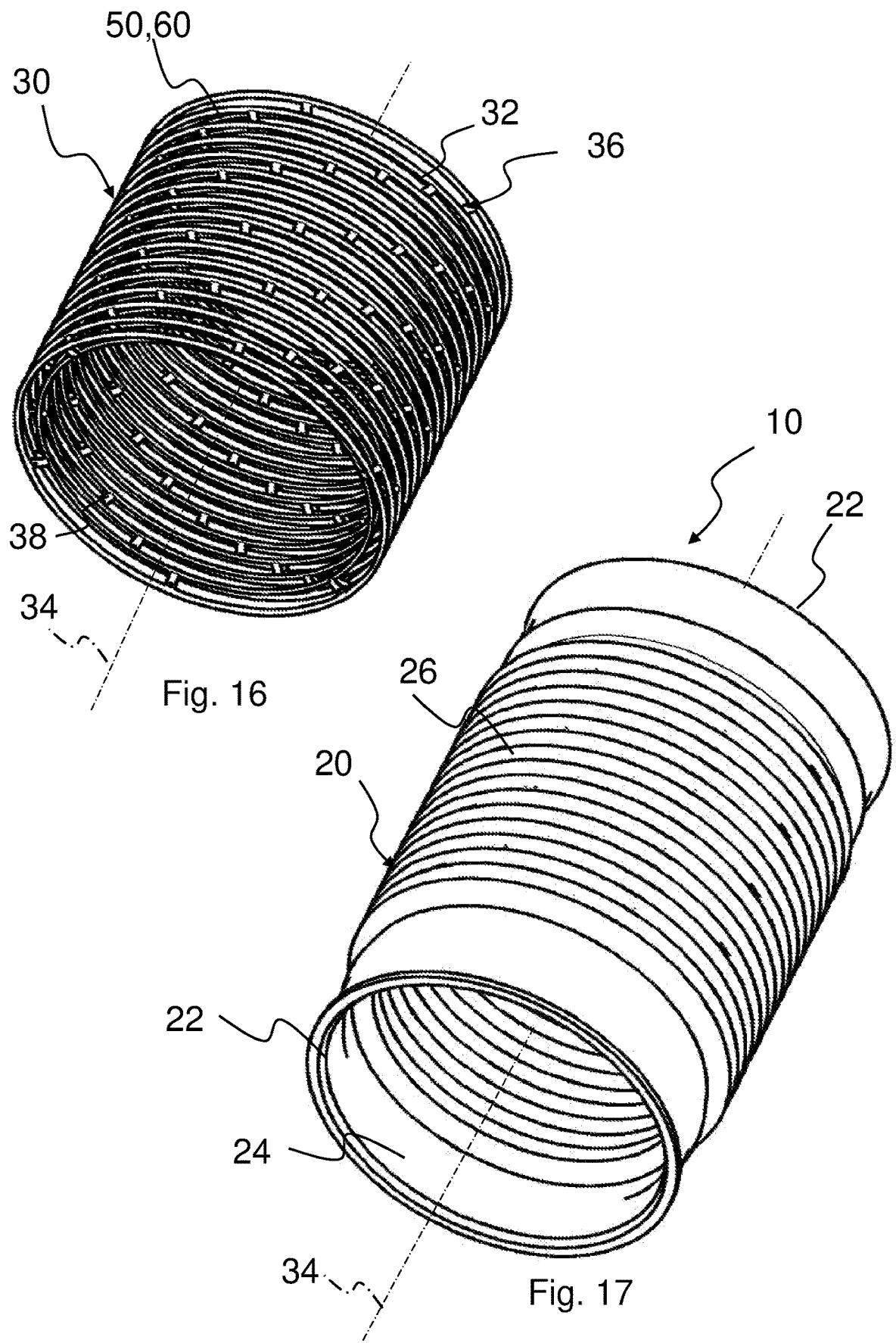

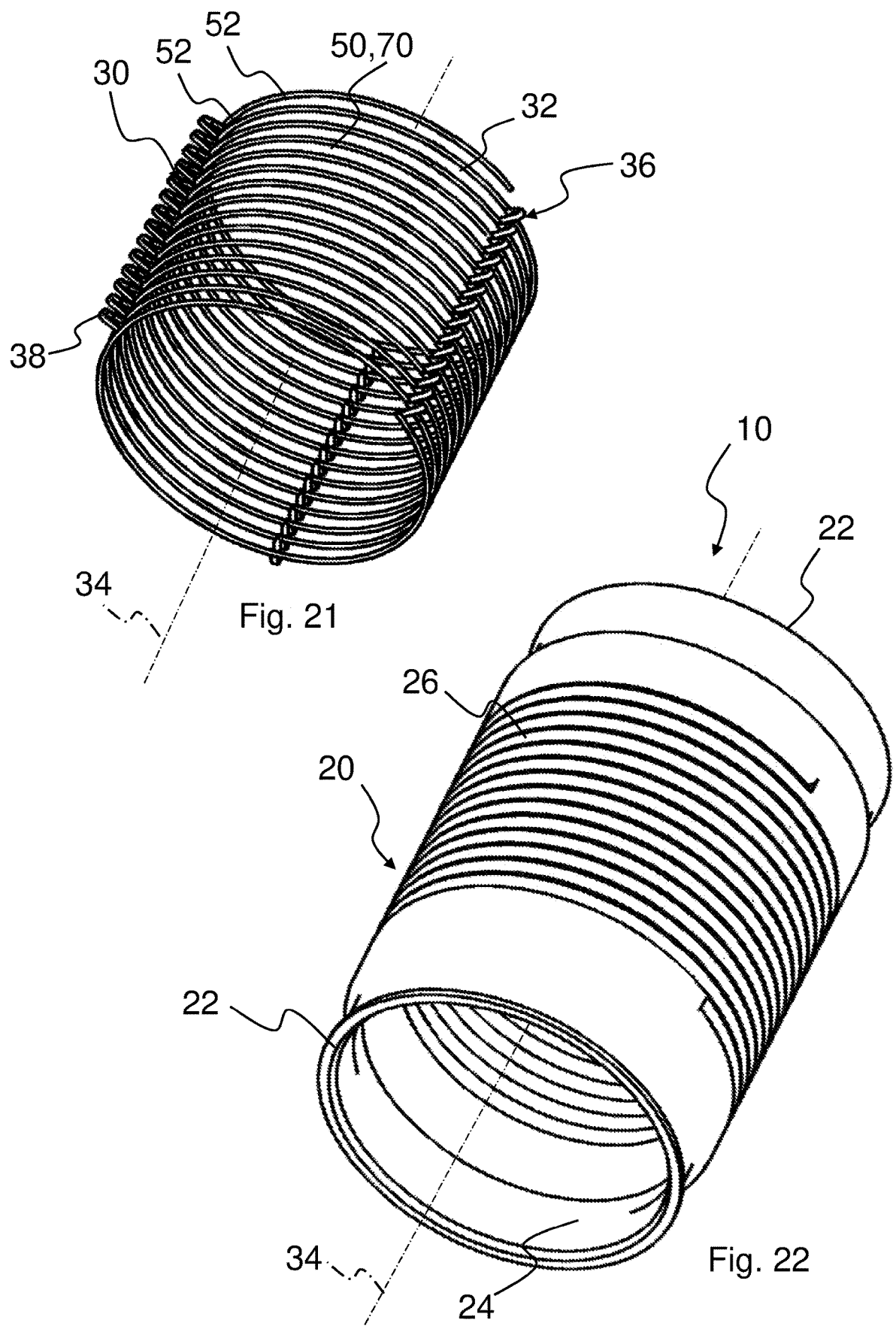

PIPE COMPONENT

CROSS-REFERENCE TO RELATED APPLICATIONS

This application is a continuation application of international application No. PCT/EP2019/057983 having an international filing date of 29 Mar. 2019 and designating the United States, the international application claiming a priority date of 24 May 2018 based on prior filed German patent application No. 10 2018 112 488.0, the entire contents of the aforesaid international application and the aforesaid German patent application being incorporated herein by reference.

BACKGROUND OF THE INVENTION

The invention concerns a pipe component with a support body.

FR 2870916 A discloses a pipe component with a skeleton-type support body of thermoplastic material which is embedded in a casing of the pipe component. The support body reinforces the pipe component against pressure differences.

Moreover, US 2017/0050369 A1 discloses a pipe component with a skeleton-type support body wherein here the support body is either wound spirally about an inner pipe to be stabilized or is comprised of individual ring segments that are not connected to each other and surround the inner pipe at axial distances.

Finally, EP 1 983 243 A1 discloses a pipe component in which an inner pipe to be reinforced is surrounded at the exterior by axially spaced apart hose clamp elements that are connected to each other.

SUMMARY OF THE INVENTION

It is an object of the invention to provide a pipe component that comprises an improved flexibility while having higher pressure stability at the same time.

The aforementioned object is solved by a pipe component with a casing as well as with a tubular support body that comprises an outer circumference and a length extension in the direction of a center line and that supports the casing, wherein the support body comprises at least one stabilization element that comprises axially spaced apart, at least partially circumferentially extending segments that, along the length extension of the support body, are connected by one or a plurality of hinges.

Beneficial embodiments and advantages of the invention result from the further claims, the description, and the drawing.

A pipe component is proposed with a casing as well as a tubular support body that comprises an outer circumference and a length extension in the direction of a center line and that supports the casing. The circumference of the support body comprises at least one stabilization element wherein axially spaced apart segments of the at least one stabilization element are connected to each other along the length extension of the support body by one or a plurality of hinges.

Rings can be provided as stabilization elements, for example. They can be slotted or closed. Also, one or a plurality of coils can be provided which may be continuous or interrupted. Moreover, depending on the cross section of the pipe component, the cross section of the stabilization element or elements can be adjusted, for example, round, oval, angular.

The pipe component according to the invention is suitable in particular for media-conveying systems, for example, raw air conduit systems, clean air conduit systems, and the like. The pipe component can be embodied straight or curved.

The support body enables compensation of system tolerances and relative movements between the components connected by the pipe component because a sufficient axial as well as angular flexibility is ensured due to the hinges. At the same time, the at least one stabilization element enables despite of this an advantageous pressure resistance of the pipe component. The casing can be comprised of an arbitrary material that is fluid-tight for the intended use. Preferably, the casing can be comprised of a material that is more elastic than the support body and provides the movability and fluid-tightness of the pipe component.

Especially advantageously, the hinges can be embodied as film hinges. They can be comprised of the same material as the stabilization elements, for example, produced by injection molding or by means of 3D printing.

With regard to flexibility, compressive strength, required installation space, material selection, media resistance, and temperature range of use, new design possibilities are provided for flexible pipe components in media-conveying systems that can be realized inexpensively.

As material for stabilization elements, thermoplastic materials or metallic materials are beneficial. For the casing, elastic materials are preferred, in particular thermoplastic materials, thermoplastic elastomers, and elastomers. A pipe component can comprise, for example, a support body of polyamide and a casing of silicone.

Since the casing is comprised of an elastic material, at the free ends of the pipe component a sealing contour can be provided, for example, for applying pipe clamps. In this way, separate seals for seal-tightly connecting the pipe component with a connector are not needed. In particular, the sealing contour is embodied as a free sleeve-shaped sealing section that is not stiffened by the support body so that in this region a sealing deformation required for sealing, for example, by force introduction with clamps, can be achieved without problem.

According to a beneficial embodiment, the hinges can comprise a deformation region which extends, at least in the unloaded state, transversely to the center line. In this way, a sufficient deformation volume in the casing of the pipe region between the segments of the stabilization element or elements can be ensured. The hinges can extend inwardly. Optionally, the hinges can also extend outwardly. Moreover, hinges can have a region which is extending inwardly and a region which extends outwardly. The shape of the hinges can be selected as needed. The hinges can be embodied, for example, V-shaped, W-shaped, S-shaped. The shape of the hinges can be selected in accordance with the use requirements of the pipe component. At a pipe component, different types of hinges can be provided. A hinge can connect two or even a plurality of axially spaced apart segments.

According to a beneficial embodiment, at least two stabilization elements can be arranged coaxially to the center line. This can be selected beneficially for desired mechanical properties, in particular flexibility, compressive strength, and torsion properties. In case of a coaxial arrangement, the segments, as described above, are displaced relative to each other in axial direction, wherein the segments in this context have different diameters; a first segment extends on a first circumference and a second segment on a second circumference.

According to a beneficial embodiment, the support body can comprise rings or ring sections as stabilization elements.

Rings can be produced easily and are easy to handle. The rings can be embodied closed or slotted.

According to a beneficial embodiment, the support body can comprise a coil or one or a plurality of coil sections as a stabilization element. Coils have a beneficial stability and are easy to handle. A continuous coil with a plurality of turns about the circumference can be provided. Optionally, one or a plurality of coil sections can be provided. Optionally, rings and/or ring sections and coils and/or coil sections can be provided at a pipe component.

According to the invention, the support body is embedded in the casing. In particular, the support body can be overmolded by the material of the casing.

By a corresponding material selection for the surrounding casing, the media resistance and the temperature range of use can be expanded or realized more cost-effectively because the support body is not exposed directly to the environmental influences and temperatures in operation. By means of a corresponding configuration of the end sections, additional sealing elements at the interfaces of the pipe component can be dispensed with.

Moreover, the casing is embodied as a folded bellows. A folded bellows provides a beneficial movability of the pipe component.

Furthermore, the hinges are received in the folds of the folded bellows. In this way, the flexibility properties of the folded bellows and the movability of the hinges can interact beneficially.

According to a beneficial embodiment, the hinges can be arranged, at least in sections, along the length extension of the support body at the same angle position about the center line at the circumference. By a suitable arrangement of the hinges, the mechanical properties of the pipe component can be influenced.

According to a beneficial embodiment, the hinges can be arranged, at least in sections, along the length extension of the support body so as to be distributed at different angle positions about the center line at the circumference. By a suitable arrangement of the hinges, the mechanical properties of the pipe component can be influenced. Optionally, it can be provided that different arrangements of hinges are provided in sections along the length extension of the pipe component.

According to a beneficial embodiment, the casing can be formed of a thermoplastic material, a thermoplastic elastomer, or an elastomer. In addition or as an alternative, the stabilization elements can be formed of a thermoplastic material or a metal. A beneficial material selection and material pair can be selected, respectively, in order to design the mechanical properties of the pipe component in a beneficial way.

According to a beneficial embodiment, the casing can have a sealing contour at its free ends. A surface for attachment of pipe clamps can be provided. Also, a sealing lip can be provided. The latter can be freely designed as needed.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

FIG. 1 shows an isometric view of a support body according to an embodiment of the invention.

FIG. 2 shows an isometric view of a pipe component according to an embodiment of the invention.

FIG. 6 shows an isometric view of a support body according to an embodiment of the invention.

FIG. 7 shows an isometric view of a pipe component according to an embodiment of the invention.

FIG. 16 shows an isometric view of a support body according to an embodiment of the invention.

FIG. 17 shows an isometric view of a pipe component according to an embodiment of the invention.

FIG. 21 shows an isometric view of a support body according to an embodiment of the invention.

FIG. 22 shows an isometric view of a pipe component according to an embodiment of the invention.

DESCRIPTION OF PREFERRED EMBODIMENTS

Figure 3:
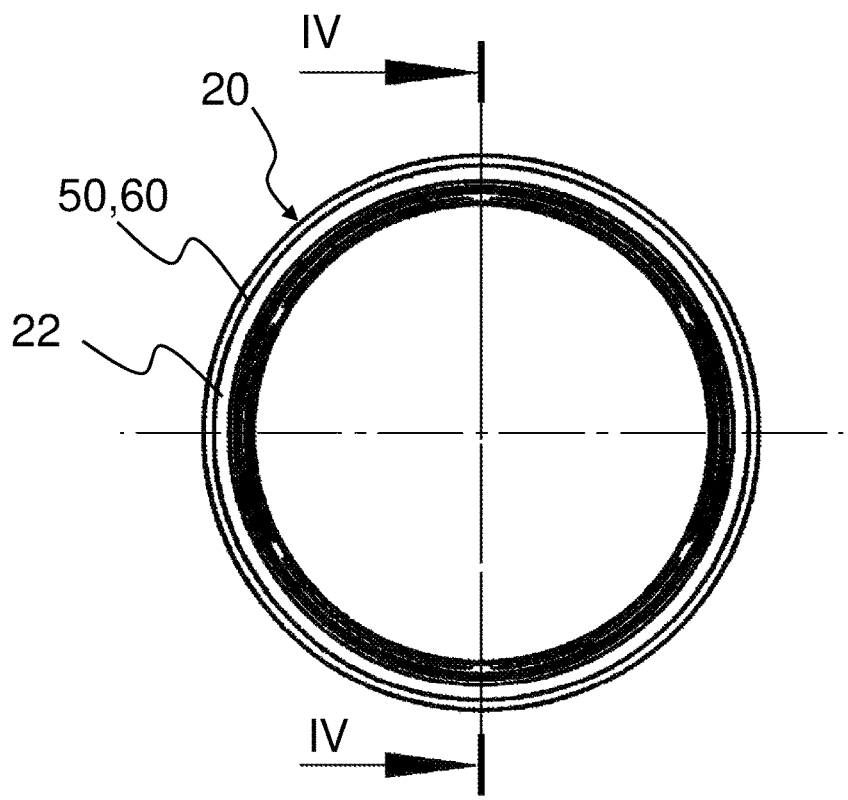
FIG. 3 shows a plan view of a free end of the pipe component of FIG. 2.
Figure 4:
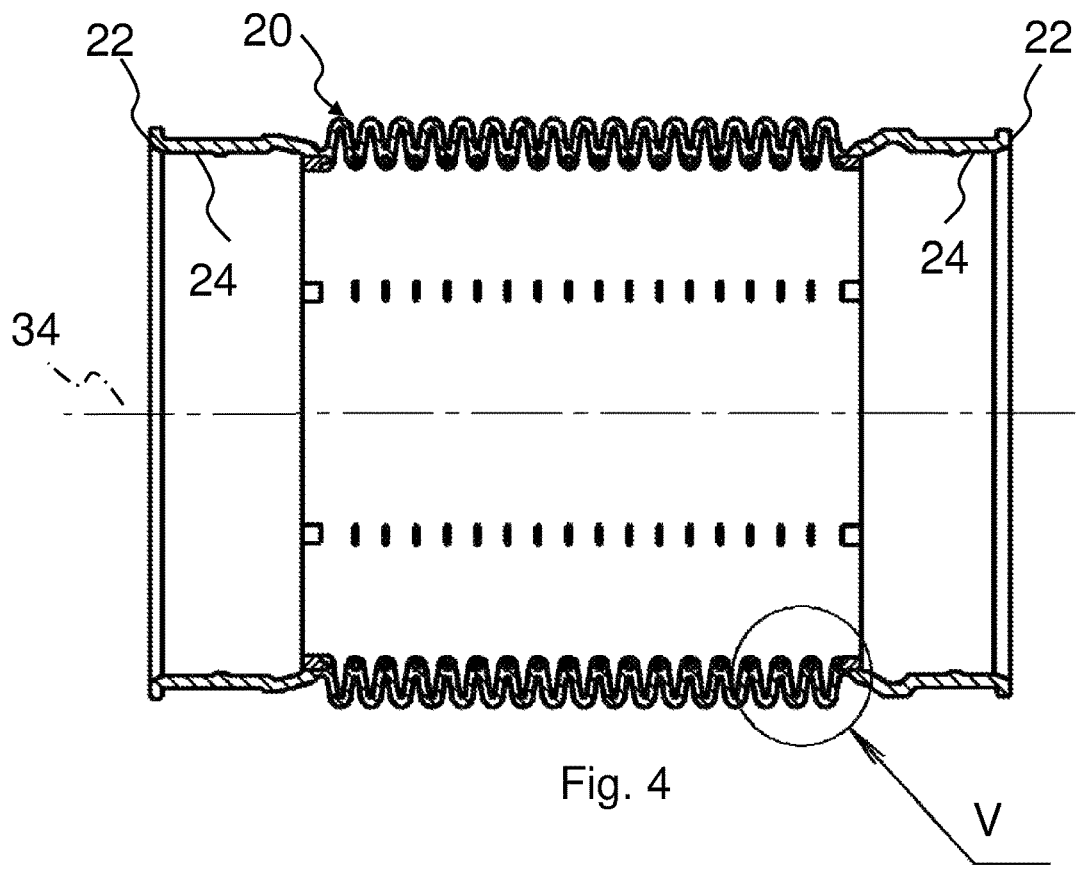
FIG. 4 shows a length section according to line IV-IV in FIG. 3.

In the Figures, same or same-type components are identified by same reference characters. The Figures show only examples and are not to be understood as limiting.

For explaining the invention, FIGS. 1 to 5 show a first embodiment of the invention. FIG. 1 shows an isometric view of a support body 30 while FIG. 2 shows an isometric view of the pipe component 10, FIG. 3 a plan view of a free end 22 of the pipe component 10, FIG. 4 a length section according to line IV-IV in FIG. 3, and FIG. 5 a detail V of the length section of FIG. 4.

The support body 30 comprises a circumference 32 and a length extension along a center line 34. The support body 30 in this example is embodied straight so that the center line 34 corresponds to the longitudinal axis. The support body 30 comprises rings 60, sequentially arranged in axial direction, as stabilization elements 50. Segments 52 of neighboring rings 60 are respectively connected by hinges 36 in the form of film hinges.

In this embodiment, the hinges 36 are distributed at the circumference 32 of the support body 30 in a diamond pattern, wherein two hinges 36 are arranged adjacent to each other and connected with the same rings 60, respectively. The arrangement of the hinges 36 at the circumference can be matched to desired properties of the pipe component 10. For example, the torsional stiffness can be influenced in a targeted fashion.

The hinges 36 comprise a deformation region 38 which is extending, at least in the unloaded state, transversely to the center line 34, in this case outwardly (FIG. 1). In this example, the hinges 36 are of a V-shaped configuration, wherein the deformation region 38 is arranged at the tip of the V and the open ends of the V are connected to the rings 60.

Figure 5:
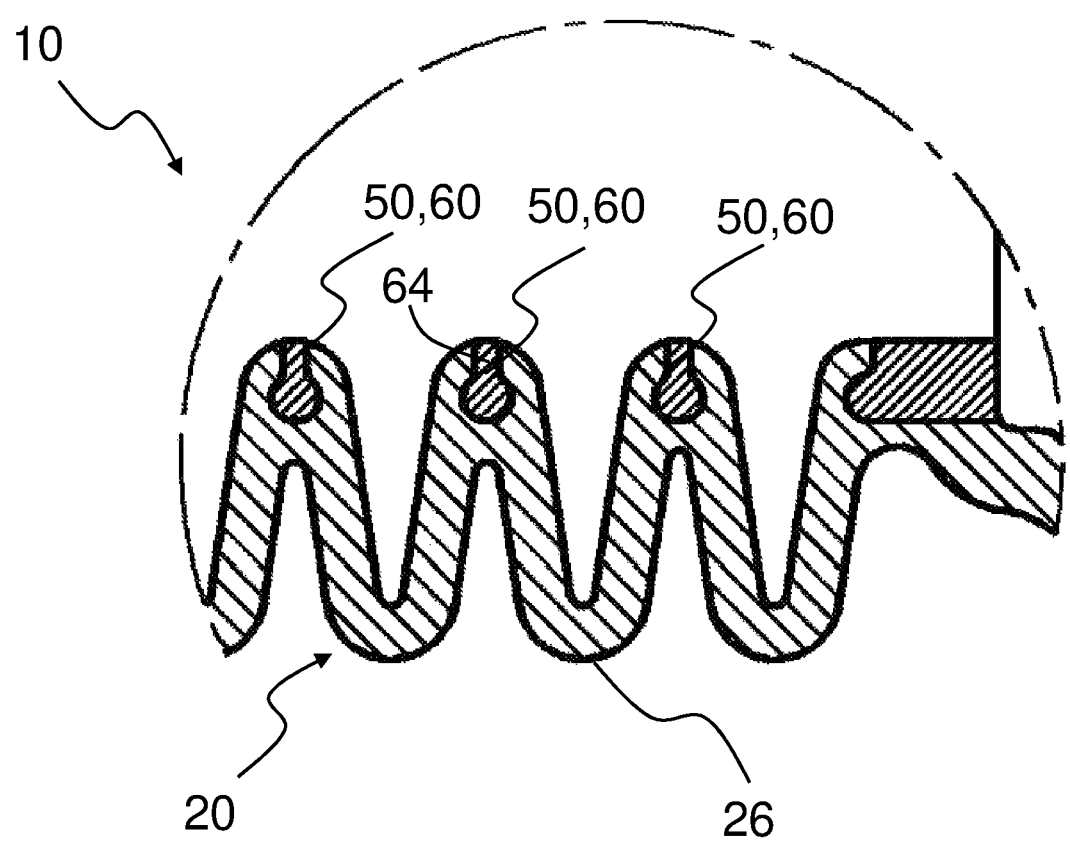
FIG. 5 shows detail V of the length section of FIG. 4.
Figure 8:
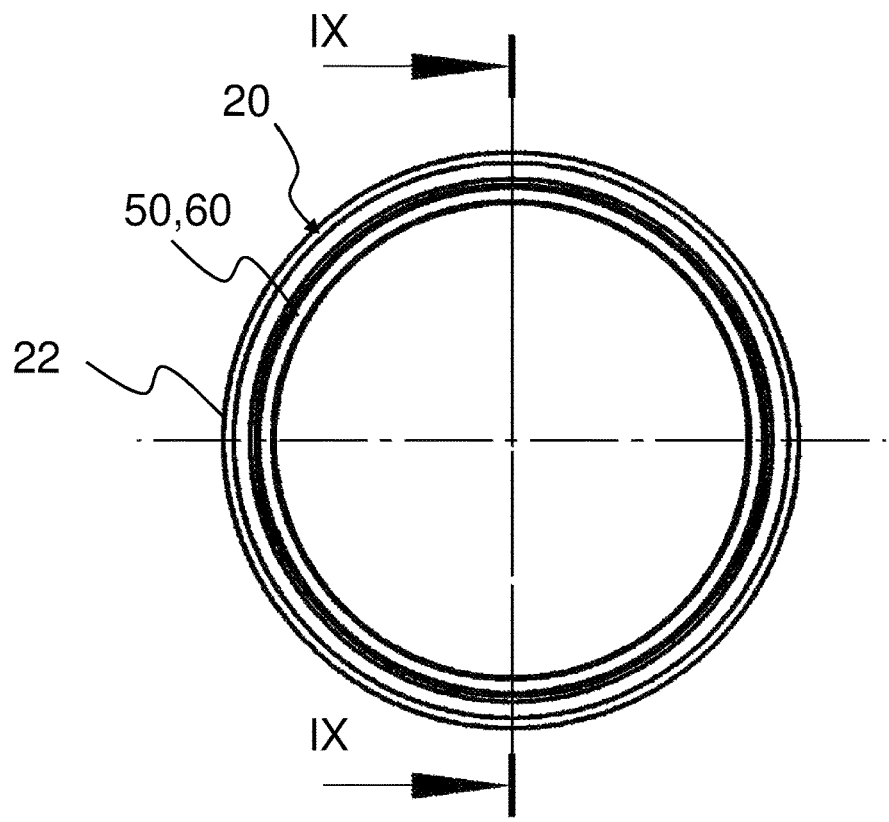
FIG. 8 shows a plan view of a free end of the pipe component of FIG. 7.
Figure 9:
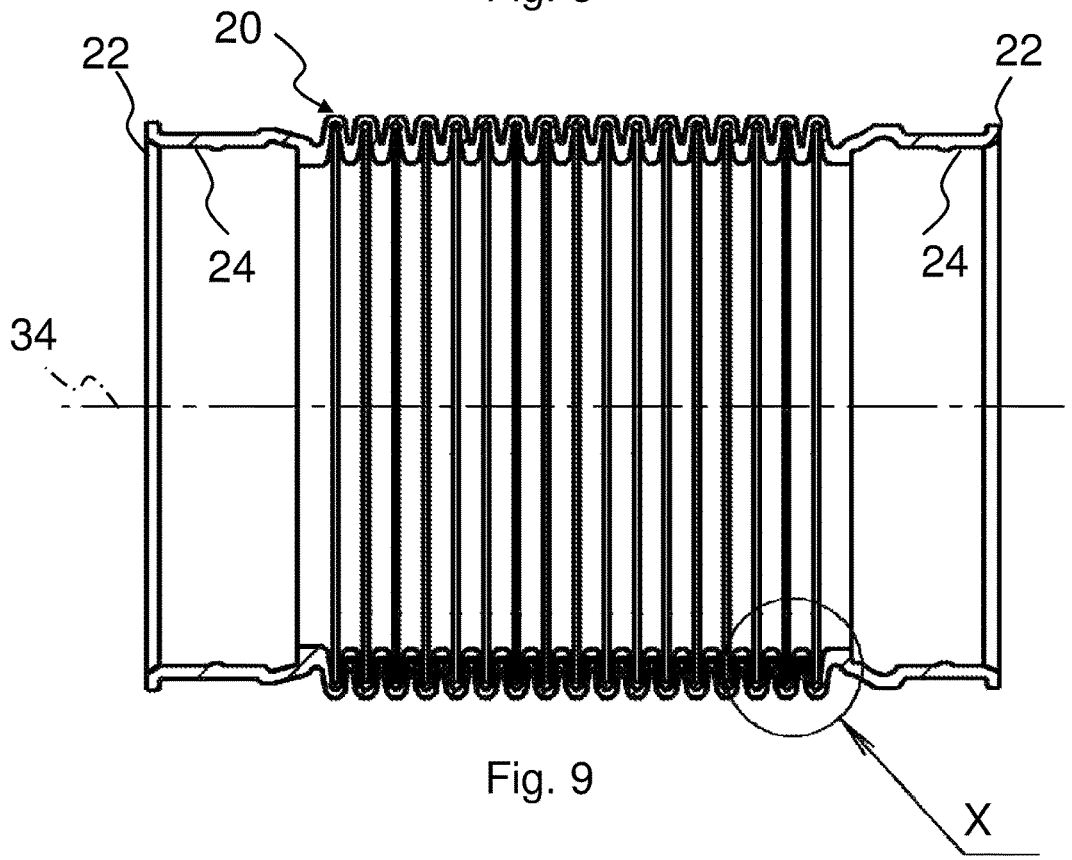
FIG. 9 shows a length section according to line IX-IX in FIG. 8.

The stabilization elements 50 can be formed so as to match the desired mechanical properties, in particular flexibility, pressure resistance, torsion properties. The section in FIG. 5 shows thus that the rings 60 are not of a torus shape, i.e., the cross section of the ring material is not circular but a flat projection 64 projects inwardly while the outer side has a circular cross section. The shape of the stabilization elements 50 can be determined for the intended use by simulation computations.

The support body 30 is embedded in the casing 20, for example, overmolded. The casing 20 is designed as a folded bellows so that folds 26 project to the interior and to the exterior. The hinges 36 are received in folds 26 of the folded bellows, namely in the fold edges of the outwardly pointing folds 26, which cannot be seen in the detail view of FIG. 5. In this embodiment, the rings 60 are received in the fold edges of the inwardly pointing folds 26.

The casing 20 comprises at its free ends 22 a sealing contour 24 which is embodied, for example, as a receptacle for a hose clamp. Since the casing 20 is formed of an elastic material, the inner surface of the casing at the free end 20 can act as a seal.

FIGS. 6 to 10 show a further embodiment of the invention. FIG. 6 shows an isometric view of a support body 30 while FIG. 7 shows an isometric view of the pipe component 10, FIG. 8 a plan view of a free end 22 of the pipe component 10, FIG. 9 a length section according to line IX-IX in FIG. 8, and FIG. 10 a detail X of the length section of FIG. 9.

The support body 30 comprises a circumference 32 and a length extension along a center line 34. The support body 30 in this example is embodied straight so that the center line 34 corresponds to the longitudinal axis. The support body 30 comprises rings 60, sequentially arranged in axial direction, as stabilization elements 50. Segments 52 (FIG. 10) of neighboring rings 60 are respectively connected by hinges 36 in the form of film hinges.

In this embodiment, the hinges 36 are arranged at the circumference 32 of the support body 30 along the length extension of the support body 30 at the same angle positions about the center line 34 at the circumference 32. The hinges 36 are of a V-shaped configuration and pass into each other in axial direction so that a corrugated course results. In this context, a hinge 36 is arranged between each one of the rings 60.

Figure 10:
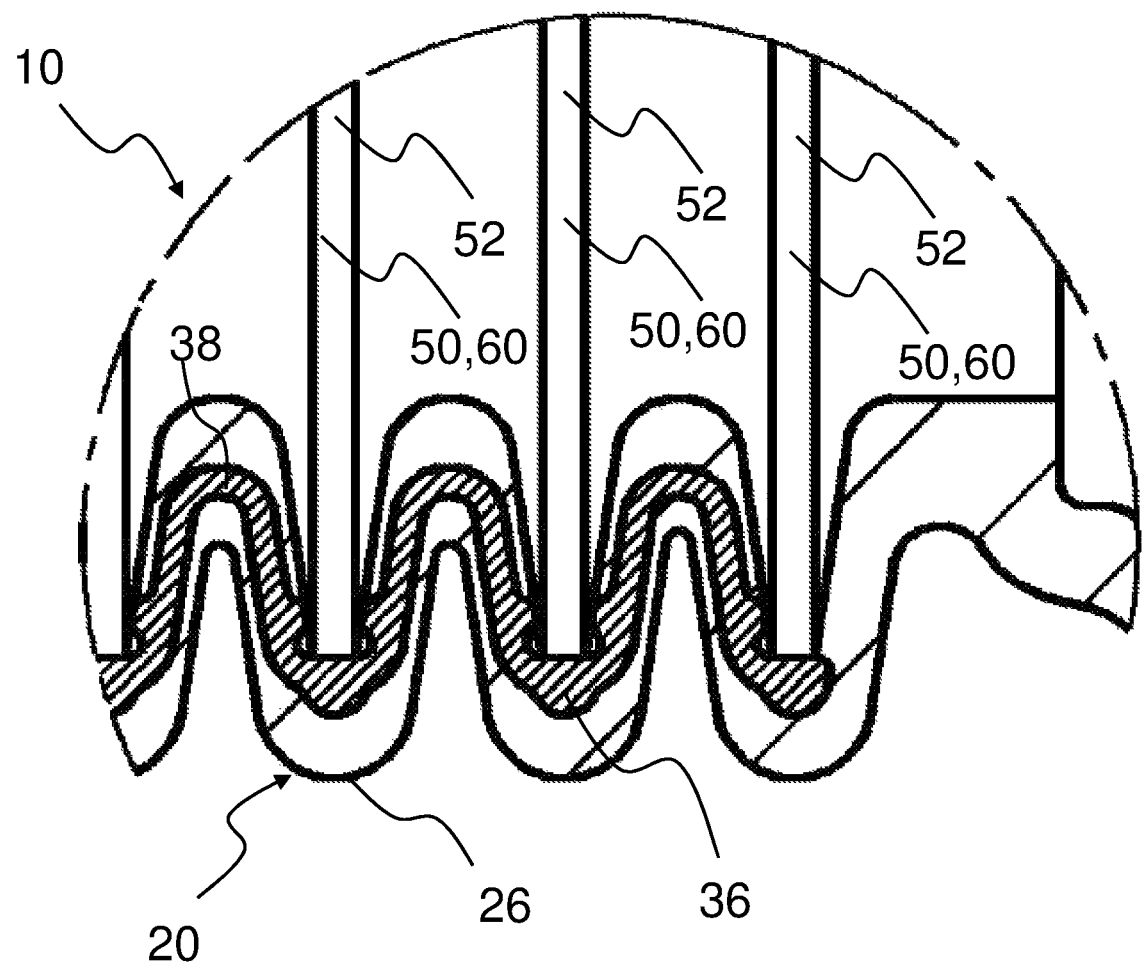
FIG. 10 shows a detail X of the length section of FIG. 9.

The hinges 36 comprise a deformation region 38 which, at least in the unloaded state, extends transversely to the center line 34, in this case inwardly into the support body 30 (FIGS. 6, 10). The deformation region 38 is arranged at the tip of the V, respectively, while the open ends are connected to the rings 60.

The support body 30 is embedded in the casing 20, for example, overmolded. In this embodiment, the rings 60 are received in the fold edges of the outwardly pointing folds 26.

The stabilization elements 50, in particular the cross-section of the material of the stabilization elements 50, can be formed to match the desired mechanical properties, in particular flexibility, pressure resistance, torsion properties. The shape of the stabilization elements 50 can be determined for the respective intended use by simulation computations.

The casing 20 is designed as a folded bellows so that folds 26 project inwardly and outwardly. The hinges 36 and their deformation regions 38 are received in the fold edges of the inwardly as well as of the outwardly pointing folds 26 of the folded bellows, as can be seen in the detail view of FIG. 10.

The casing 20 comprises at its free ends 22 a sealing contour 24 which, for example, is embodied as a receptacle for a hose clamp. Since the casing 20 is formed of an elastic material, the inner surface of the casing can act at the free end 22 as a seal.

Figures 11, 12:
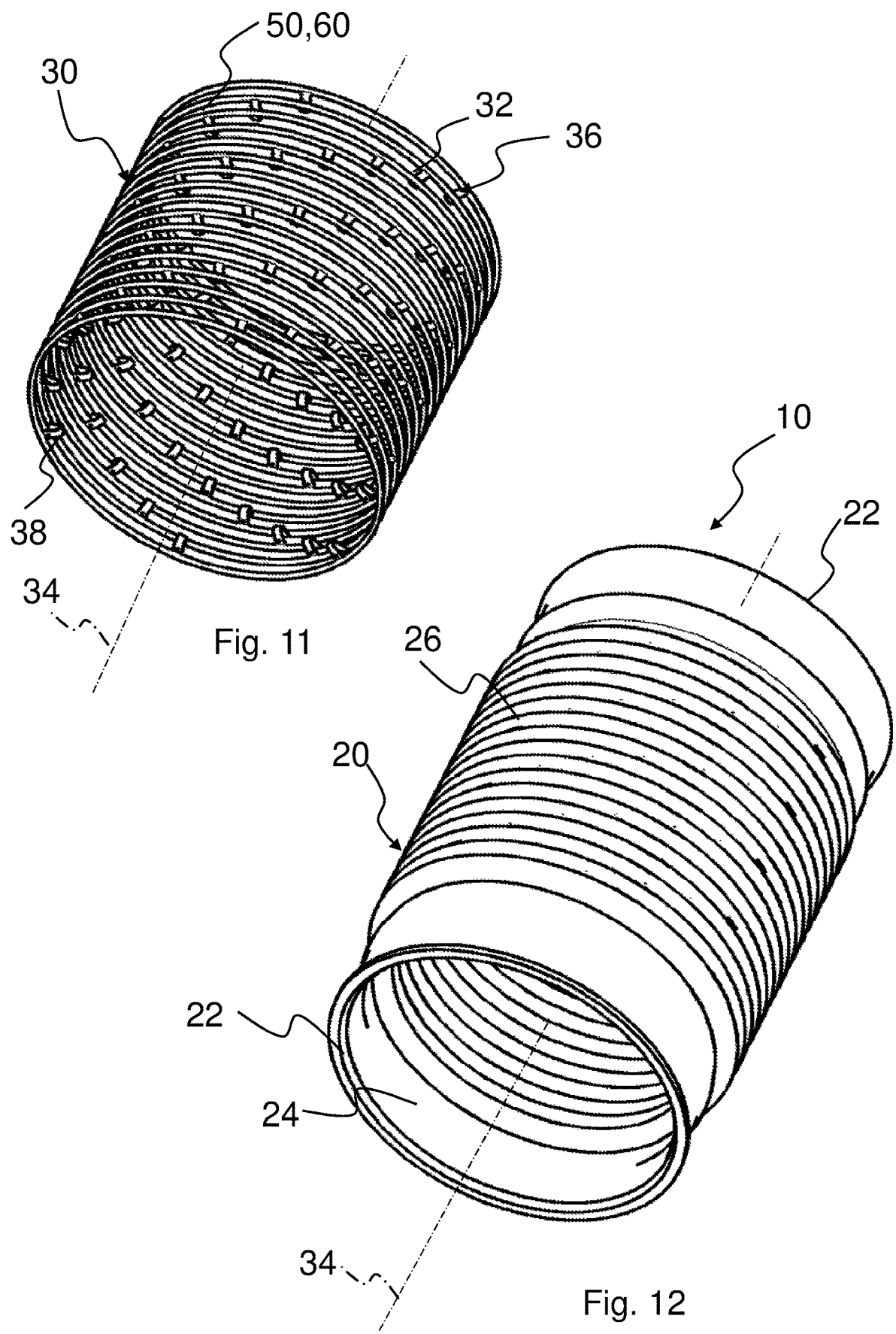
FIG. 11 shows an isometric view of a support body according to an embodiment of the invention.
FIG. 12 shows an isometric view of a pipe component according to an embodiment of the invention.
Figure 13:
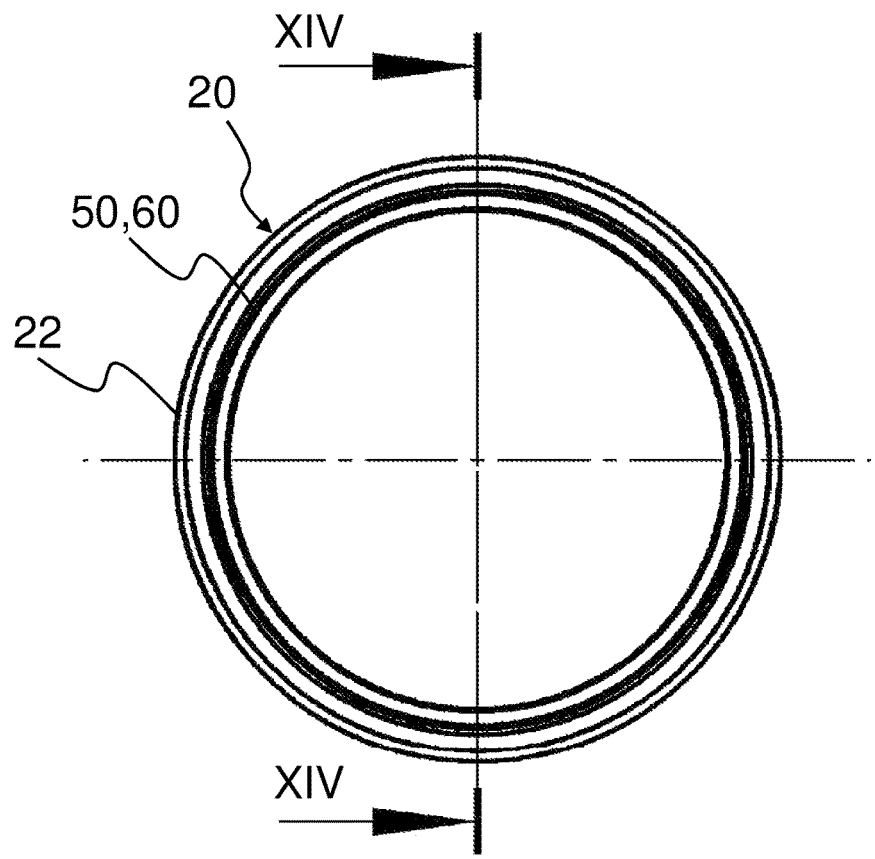
FIG. 13 shows a plan view of a free end of the pipe component of FIG. 12.
Figure 14:
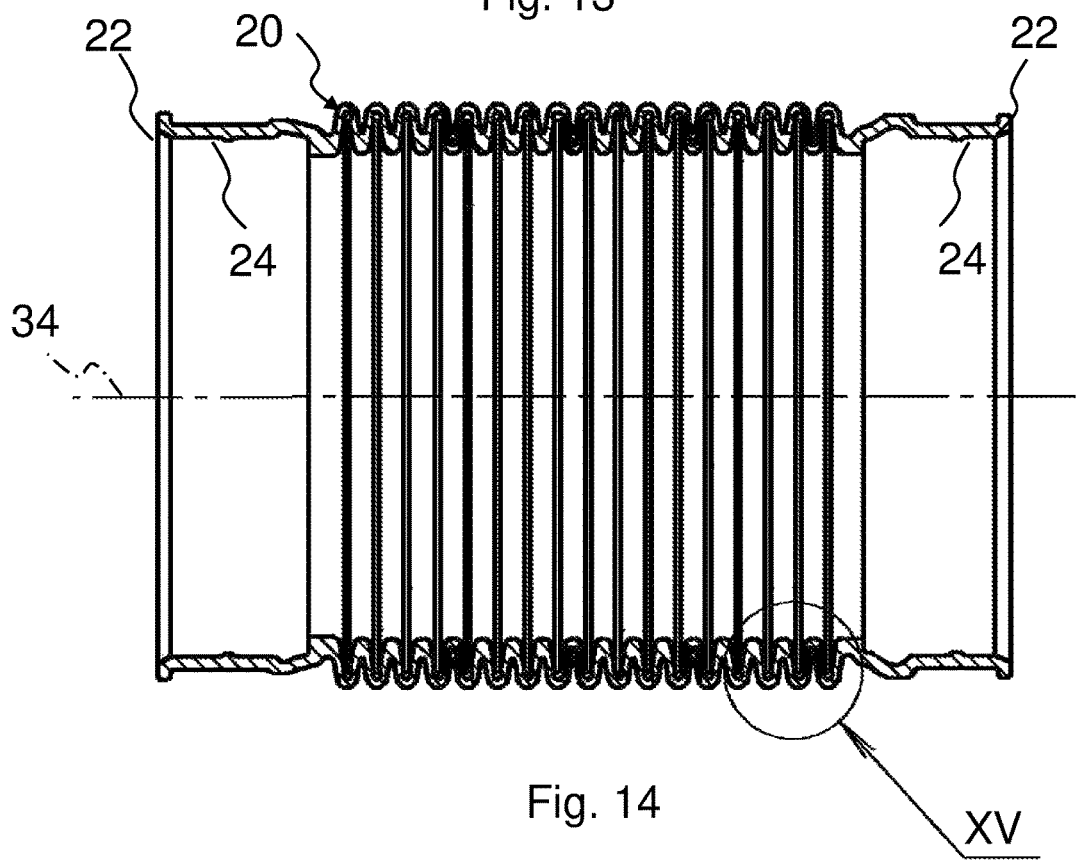
FIG. 14 shows a length section corresponding to line XIV-XIV in FIG. 13.

FIGS. 11 to 15 show a further embodiment of the invention. FIG. 11 shows an isometric view of a support body 30 while FIG. 12 shows an isometric view of the pipe component 10, FIG. 13 a plan view of a free end 22 of the pipe component 10, FIG. 14 a length section corresponding to line XIV-XIV in FIG. 13, and FIG. 15 a detail XV of the length section of FIG. 14.

The support body 30 comprises a circumference 32 and a length extension along a center line 34. The support body 30 in this example is embodied straight so that the center line 34 corresponds to the longitudinal axis. The support body 30 comprises rings 60, sequentially arranged in axial direction, as stabilization elements 50. Segments 52 (FIG. 15) of neighboring rings 60 are respectively connected to each other by hinges 36 in the form of film hinges.

In this embodiment, the hinges 36 at the circumference 32 of the support body 30 are distributed in a coil shape wherein neighboring rings 60 are respectively connected by hinges 36 distributed at the circumference 32.

Figure 15:
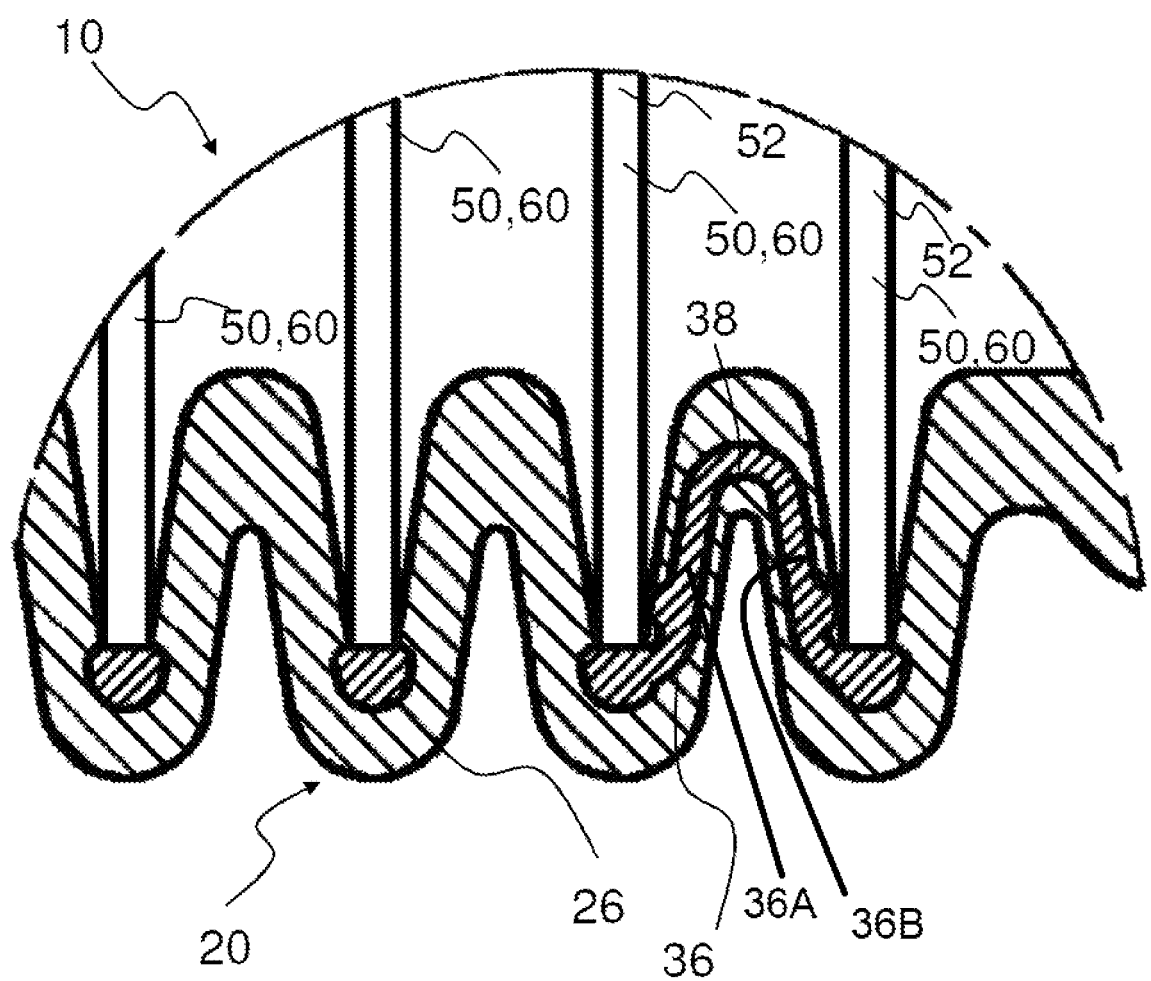
FIG. 15 shows a detail XV of the length section of FIG. 14.
Figure 18:
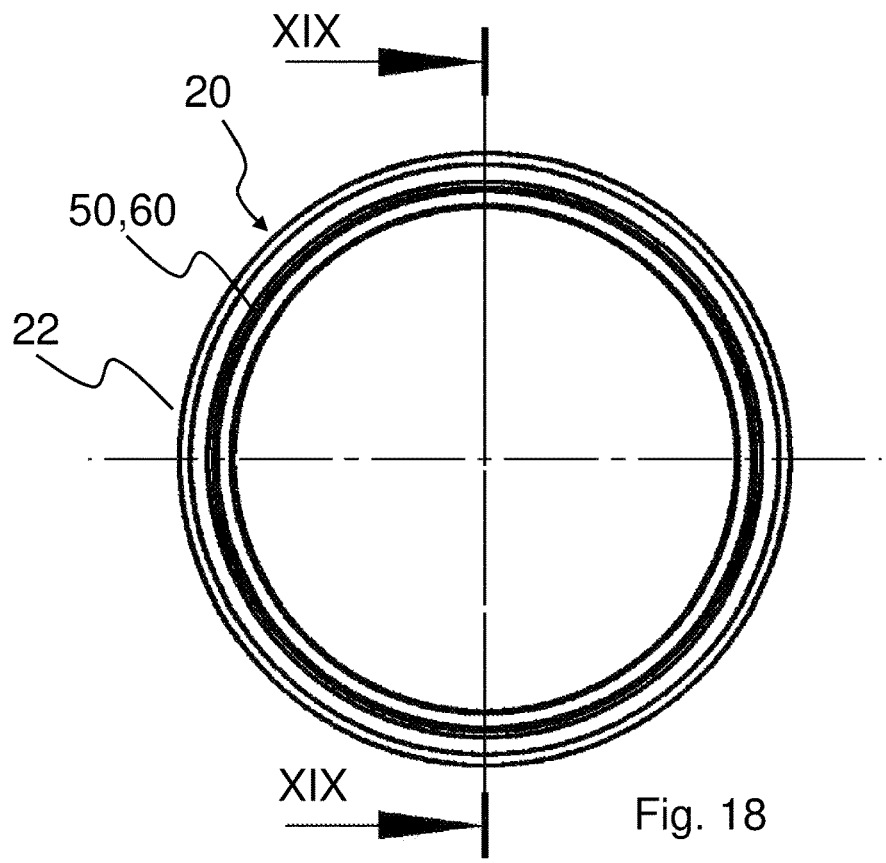
FIG. 18 shows a plan view of a free end of the pipe component of FIG. 17.
Figure 19:
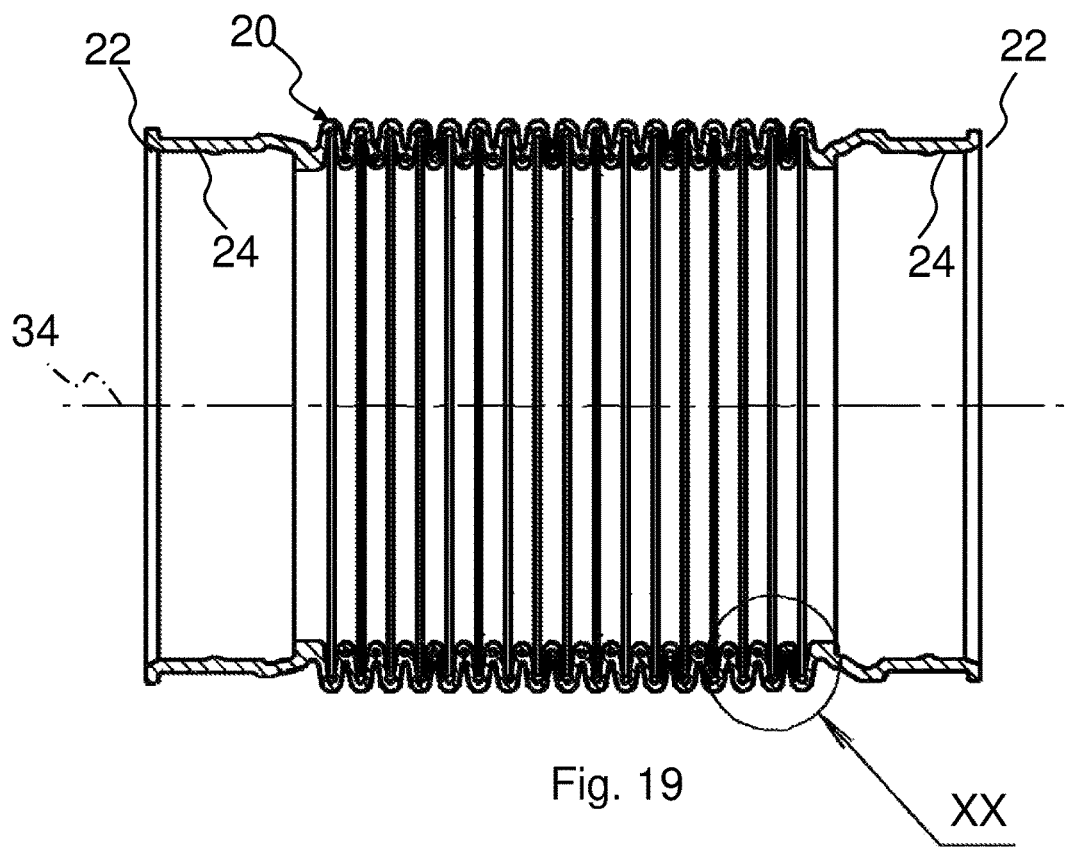
FIG. 19 shows a length section along the section line XIX-XIX in FIG. 18.

The hinges 36 comprise a deformation region 38 which, at least in the unloaded state, extends transversely to the center line 34, in this case inwardly (FIG. 15). In this example, the hinges 36 are of a V-shaped configuration having a first leg 36A and second leg 36B, each connected to a different one of two adjacent rings 60 at an open end of the hinge and extending to connect to opposite end of the deformation region 38 forming the tip of the hinge 36. The open ends are connected to the rings 60.

The support body 30 is embedded in the casing 20, for example, overmolded. The casing 20 is embodied as a folded bellows so that the folds 26 project inwardly and outwardly. The hinges 36 are received in the folds 26 of the folded bellows. In this embodiment, the rings 60 are received in the fold edges of the outwardly pointing folds 36 and the hinges 36 or their deformation regions 38 in the fold edges of the inwardly pointing folds 26 (FIG. 15).

The stabilization elements 50 can be formed to match the desired mechanical properties, in particular flexibility, pressure resistance, torsion properties. The section of FIG. 15 shows thus that the rings 60 are not of a torus shape, i.e., the cross section of the ring material is not circular but the cross section of the ring material is flattened toward the interior. The shape of the stabilization elements 50 can be determined for the respective intended use by simulation computations.

The casing 20 comprises at its free ends 22 a sealing contour 24 which is embodied, for example, as a receptacle for a hose clamp. Since the casing 20 is formed of an elastic material, the inner surface of the casing at the free end 22 can act as a seal.

FIGS. 16 to 20 show a further embodiment of the invention. FIG. 16 shows an isometric view of a support body 30 while FIG. 17 shows an isometric view of the pipe component 10, FIG. 18 a plan view of a free end 22 of the pipe component 10, FIG. 19 a length section along the section line XIX-XIX in FIG. 18, and FIG. 20 a detail XX of the length section of FIG. 19.

The support body 30 comprises a circumference 32 and a length extension along a center line 34. The support body 30 in this embodiment is embodied straight so that the center line 34 corresponds to the longitudinal axis. The support body 30 comprises as stabilization elements 50 two groups of rings 60 that are arranged concentrically relative to the center line 34 and sequentially in axial direction. Segments 52 (FIG. 20) of neighboring rings 60 are respectively connected by hinges 36 in the form of film hinges.

Figure 20:
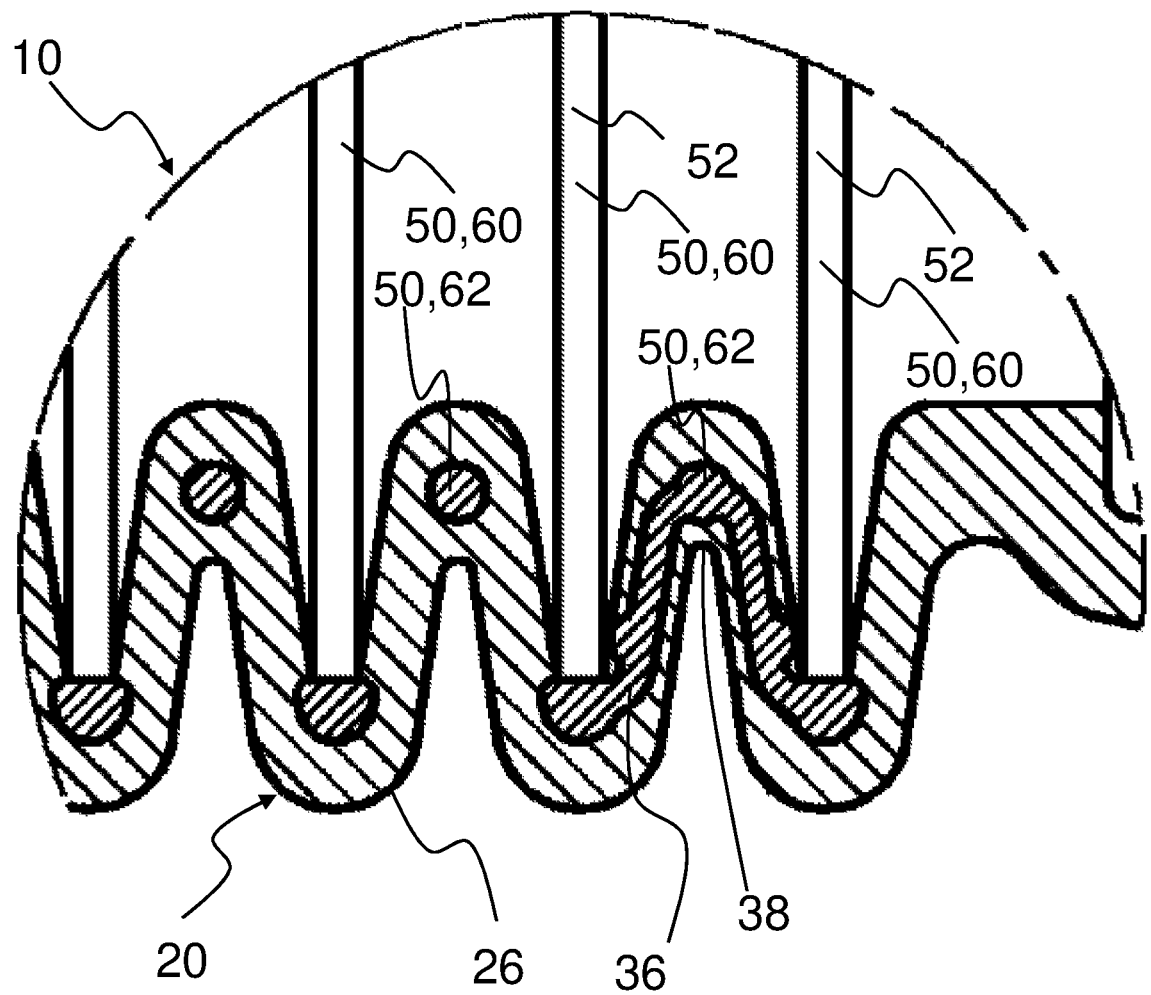
FIG. 20 shows a detail XX of the length section of FIG. 19.
Figure 23:
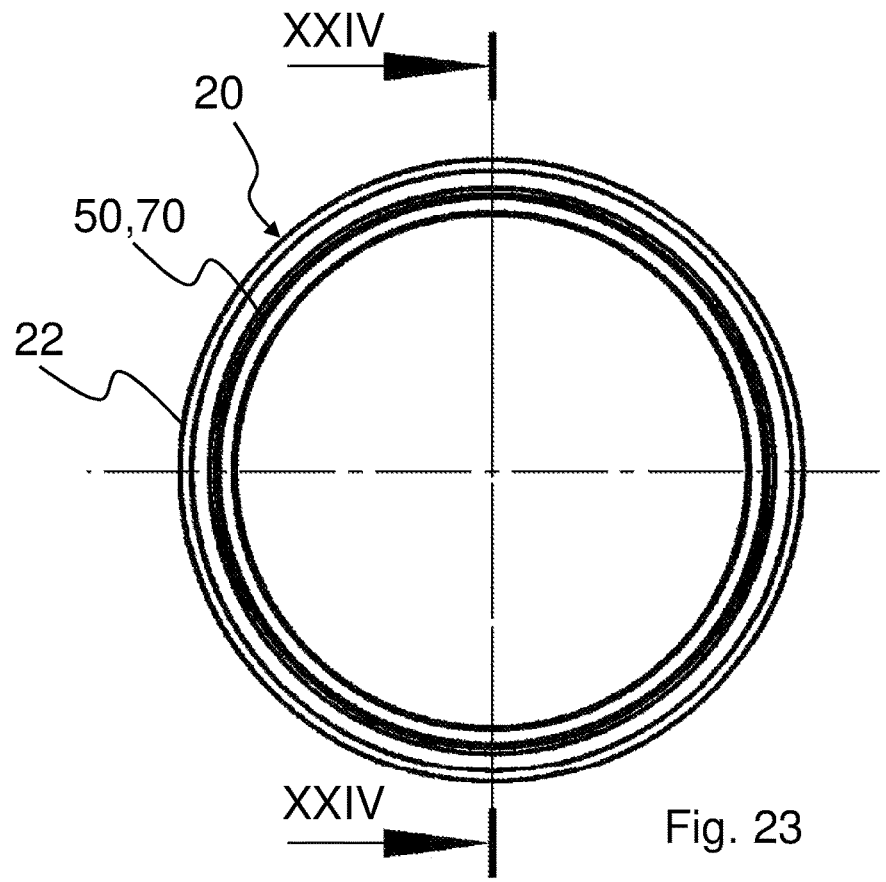
FIG. 23 shows a plan view of a free end of the pipe component of FIG. 22.
Figure 24:
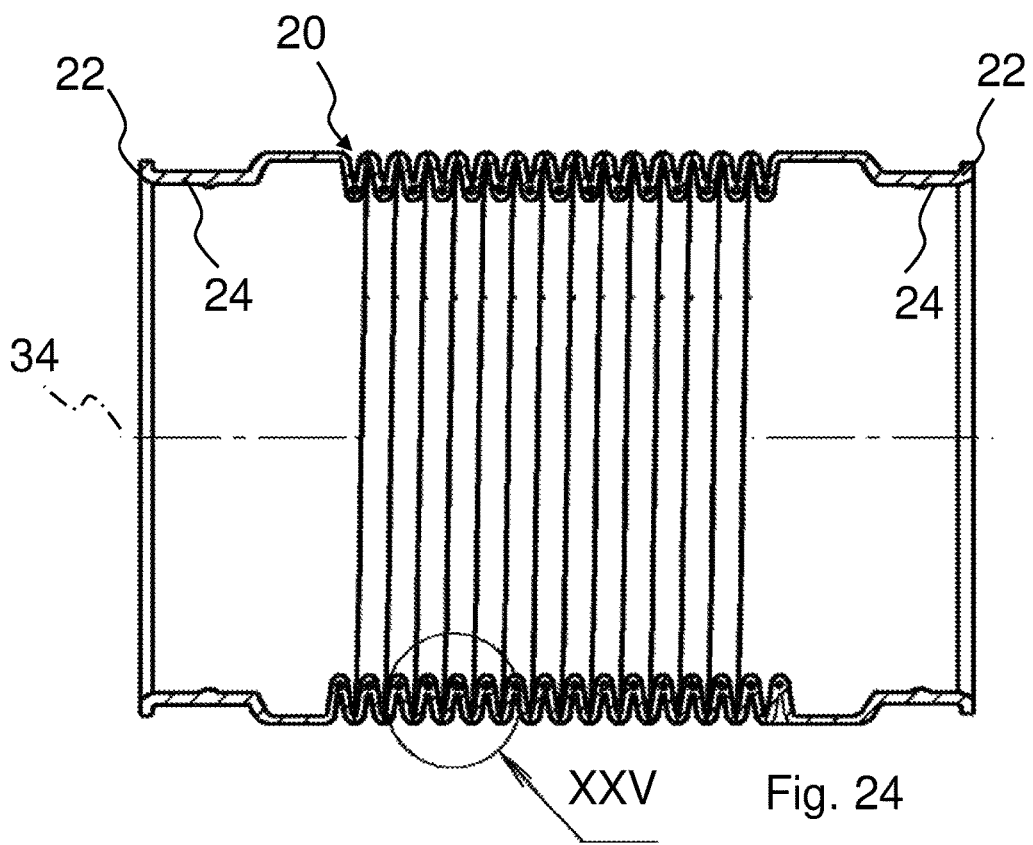
FIG. 24 shows a length section corresponding to line XXIV-XXIV in FIG. 23.
Figure 25:
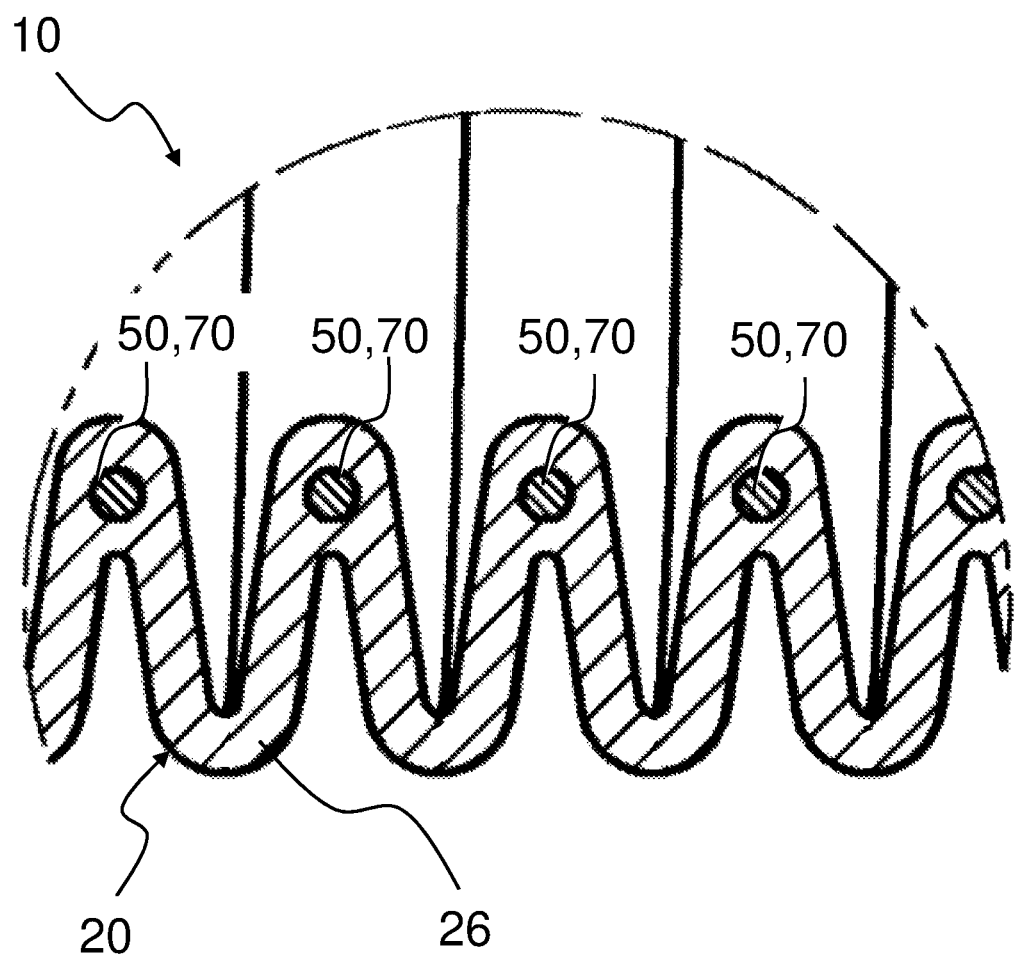
FIG. 25 shows a detail XXV of the length section of FIG. 24.

The hinges 36 are distributed along the length extension of the support body 30 in a coil shape at the circumference 32 and connect respectively two neighboring rings 60 with the same diameter and a ring 62 with a smaller diameter, which is axially positioned between the two neighboring rings 60. The hinges 36 comprise a deformation region 38 which, at least in the unloaded state, extends transversely to the center line 34, in this case inwardly (FIG. 20).

The hinges 36 are of a V-shaped configuration. Each hinge 36 is connected with the deformation region 36 at its tip to the smaller ring 62 between the two larger rings 60 while the open ends of the hinges 36 are connected to the two rings 60 with larger diameter.

The support body 30 is embedded in the casing 20, for example, overmolded. The casing 20 is embodied as a folded bellows so that folds 26 project inwardly and outwardly. The hinges 36 are received in the folds 26 of the folded bellows. The smaller rings 62 are received in the inwardly pointing fold edges of the folds 26 and the larger ring 60 in the outwardly pointing fold edges of the folds 26.

The stabilization elements 50 can be formed to match the desired mechanical properties, in particular flexibility, pressure resistance, torsion properties. The section in FIG. 20 shows thus that the rings 60 with larger diameter, in contrast to the smaller rings 62, are not of a torus shape, i.e., the cross section of the ring material of the rings 60 is not circular but they are flattened toward the interior. The shape of the stabilization elements 50 can be determined for the respective intended use by simulation computations.

The casing 20 comprises at its free ends 22 a sealing contour 24 which is embodied, for example, as a receptacle for a hose clamp. Since the casing 20 is formed of an elastic material, the inner surface of the casing at the free end 22 can act as a seal.

FIGS. 21 to 25 show a further embodiment of the invention. FIG. 21 shows an isometric view of a support body 30 while FIG. 22 shows an isometric view of the pipe component 10, FIG. 23 a plan view of a free end 22 of the pipe component 10, FIG. 24 a length section corresponding to line XXIV-XXIV in FIG. 23, and FIG. 25 a detail XXV of the length section of FIG. 24.

The support body 30 comprises a circumference 32 and a length extension along a center line 34. The support body 34 in this example is embodied straight so that the center line 34 corresponds to the longitudinal axis. The support body 30 comprises a coil 70 as a stabilization element 50. Neighboring segments 52 (FIG. 21) of the coil 70 in axial direction are respectively connected by hinges 36 in the form of film hinges.

In this embodiment, the hinges 36 at the circumference 32 of the support body 30 in axial direction are arranged at the same angle positions about the center line 34 wherein hinges 36 at the circumference are spaced apart, for example, by 120°, so that three hinge lines parallel to the center line 34 are formed at the circumference 32.

The hinges 36 comprise a deformation region 38 which extends, at least in the unloaded state, transversely to the center line 34, in this case to the exterior (FIG. 21).

The support body 30 is embedded in the casing 20, for example, overmolded. The casing 20 is embodied as a folded bellows so that folds 26 project inwardly and outwardly. The hinges 36 are received in folds 26 of the folded bellows which cannot be seen in the detail view in FIG. 25. The coil 70 is received in the inwardly pointing fold edges of the folds 26.

The stabilization elements 50 can be formed to match the desired mechanical properties, in particular flexibility, pressure resistance, torsion properties. In this embodiment, the coil material has a circular cross-section. The shape of the stabilization elements 50 can be determined for the respective intended use by simulation computations.

The casing 20 comprises at its free ends 22 a sealing contour 24 which, for example, is embodied as a receptacle for a hose clamp. Since the casing 20 is formed of an elastic material, the inner surface of the casing at the free end 22 can act as a seal.

In the illustrated embodiments, the cross section of the pipe component 10 is embodied circular, respectively. It is understood that the cross section can also be differently embodied, for example, oval or angular. The cross section of the support body 30 can then be matched preferably to the cross section of the pipe component 10.

What is claimed is:

1. A pipe component comprising:
   a casing configured as a folded bellows comprising folds;
   a tubular support body comprising an outer circumference and a length extension in a direction of a center line of the tubular support body, wherein the tubular support body is embedded in the casing and supports the casing;
   wherein the tubular support body comprises at least one stabilization element;
   wherein the at least one stabilization element comprises segments that are axially spaced apart and at least partially extend circumferentially;
   a plurality of hinges arranged between and connected at opposing ends to a different one of two adjacent segments of the at least one stabilization element, the hinges include:
      a deformation region arranged between the two adjacent segments, wherein, at least in an unloaded state thereof, the deformation region forms a tip which projects radially inwardly in a direction transverse to the center line into an interior of the tubular support body;
   wherein the hinge further includes:
      a first leg of the hinge having a first end connected to a first respective one of the two adjacent segments and an opposite second end connected to the deformation region;
      a second leg of the hinge having a first end connected to a different respective one of the two adjacent segments and an opposite second end connected to the deformation region, such that each segment is connected to at least one adjacent segment by at least one hinge of the plurality of hinges;

wherein the segments are connected by the plurality of hinges, respectively, along the length extension of the tubular support body;

wherein the hinges are arranged in the folds of the folded bellows.

2. The pipe component according to claim 1, wherein the hinges are V-shaped hinges, the deformation region forming the radially inwardly projecting tip of the hinges.

3. The pipe component according to claim 1, wherein the hinges are film hinges.

4. The pipe component according to claim 1, wherein the segments of the at least one stabilization element comprise rings or ring sections.

5. The pipe component according to claim 1, wherein the segments of the at least one stabilization element comprise a coil or at least one coil section.

6. The pipe component according to claim 1, wherein the hinges are arranged at different angle positions about the center line at the circumference at least in sections along the length extension of the support body.

7. The pipe component according to claim 1, wherein the casing is formed of a thermoplastic material, a thermoplastic elastomer, or an elastomer.

8. The pipe component according to claim 1, wherein the at least one stabilization element consists of a thermoplastic material.

9. The pipe component according to claim 1, wherein the casing is formed of a thermoplastic material, a thermoplastic elastomer, or an elastomer and wherein the at least one stabilization element is formed of and consists of either one of a thermoplastic material or a metal.

10. The pipe component according to claim 1, wherein the casing comprises a sealing contour at least at one end of the casing.

11. The pipe component according to claim 10, wherein the sealing contour is a sleeve-shaped sealing section that is not stiffened by the tubular support body.

12. The pipe component according to claim 1, wherein the casing is overmolded onto the tubular support body.

\* \* \* \* \*